United States Patent
Ng et al.

(10) Patent No.: US 8,044,899 B2
(45) Date of Patent: Oct. 25, 2011

(54) METHODS AND APPARATUS FOR BACKLIGHT CALIBRATION

(75) Inventors: Pak Hong Ng, Kowloon (HK); Shou Lung Chen, Shatin (HK); Chen Jung Tsai, Hsinchu (TW)

(73) Assignee: Hong Kong Applied Science and Technology Research Institute Company Limited, New Territories (HK)

( * ) Notice: Subject to any disclaimer, the term of this patent is extended or adjusted under 35 U.S.C. 154(b) by 908 days.

(21) Appl. No.: 11/819,372

(22) Filed: Jun. 27, 2007

(65) Prior Publication Data

US 2009/0001251 A1    Jan. 1, 2009

(51) Int. Cl.
  *G09G 3/32* (2006.01)
(52) U.S. Cl. .......................................... 345/83; 345/102
(58) Field of Classification Search .................. 345/102, 345/207, 82–83, 76–77, 204, 69; 315/149, 315/307–308, 169.3; 313/498; 349/62, 69, 349/70
  See application file for complete search history.

(56) References Cited

U.S. PATENT DOCUMENTS

| | | | | |
|---|---|---|---|---|
| 5,786,801 A * | 7/1998 | Ichise | | 345/102 |
| 6,069,676 A * | 5/2000 | Yuyama | | 349/62 |
| 6,127,783 A * | 10/2000 | Pashley et al. | | 315/149 |
| 6,495,964 B1 * | 12/2002 | Muthu et al. | | 315/149 |
| 6,498,440 B2 * | 12/2002 | Stam et al. | | 315/291 |
| 6,608,453 B2 * | 8/2003 | Morgan et al. | | 315/312 |
| 6,674,060 B2 * | 1/2004 | Antila | | 250/205 |
| 6,927,766 B2 * | 8/2005 | Tagawa et al. | | 345/204 |
| 7,045,974 B2 * | 5/2006 | Lin et al. | | 315/308 |
| 7,140,752 B2 * | 11/2006 | Ashdown | | 362/276 |
| 6,992,803 B2 | 1/2007 | Chang | | |
| 7,176,879 B1 * | 2/2007 | Yoshihara et al. | | 345/102 |

(Continued)

FOREIGN PATENT DOCUMENTS

JP    02-039618    *    2/1990

(Continued)

*Primary Examiner* — Ricardo L Osorio
(74) *Attorney, Agent, or Firm* — Ella Cheong Hong Kong; Margaret A. Burke; Sam T. Yip

(57) ABSTRACT

Methods and apparatuses for backlight calibration are described. The apparatus 100 comprises a backlight unit 102 comprising a plurality of light sources 120, at least one photo-sensor 103 adapted to measure the light emitted by the backlight unit 102, a photo-sensor controller 112 coupled to the photo-sensor 103 for controlling the photo-sensor(s) 103, a backlight driving circuit 104 coupled to the light sources 120 for providing individual driving on each light source, a signal generator 114 coupled to the photo-sensor controller 112 and the backlight driving circuit 104 for controlling the operation timing of photo-sensors 103 and each of the light source 120 such that lighting conditions from each of the light source can be acquired, and a processing unit 111 coupled to the photo-sensor 103 and the backlight driving circuit 104 for analyzing the measurement data from the photo-sensors 103 and providing an adjustment signal to the backlight driving circuit 104 to achieve uniform lighting conditions of the backlight unit 102. Also described is a method comprising the steps of providing saved settings for backlight driver, providing a modified timing sequence to backlight driver and photo sensor 202, measuring light conditions of each individual light source or each individual group of light sources in backlight unit 203, comparing measurement data with predefined light conditions 205, calculating the adjustment required on backlight drivel to achieve desired light conditions, and saving calculated adjustment as new settings for backlight driver 207.

21 Claims, 11 Drawing Sheets

U.S. PATENT DOCUMENTS

| | | | |
|---|---|---|---|
| 7,301,158 B1* | 11/2007 | Hoang | 250/458.1 |
| 7,324,080 B1* | 1/2008 | Hu et al. | 345/102 |
| 7,393,128 B2* | 7/2008 | Sakai et al. | 362/613 |
| 7,423,626 B2* | 9/2008 | Yamamoto et al. | 345/102 |
| 7,595,786 B2* | 9/2009 | Shih | 345/102 |
| 7,675,501 B2* | 3/2010 | Shin et al. | 345/102 |
| 7,718,942 B2* | 5/2010 | Lim et al. | 250/205 |
| 2002/0060284 A1* | 5/2002 | Mizuno et al. | 250/214 A |
| 2002/0070914 A1* | 6/2002 | Bruning et al. | 345/102 |
| 2003/0076056 A1* | 4/2003 | Schuurmans | 315/291 |
| 2003/0231161 A1* | 12/2003 | Yamaguchi | 345/102 |
| 2004/0145301 A1* | 7/2004 | Yoshida | 313/498 |
| 2005/0073845 A1* | 4/2005 | Matsui | 362/293 |
| 2005/0200578 A1* | 9/2005 | Lee et al. | 345/82 |
| 2006/0049781 A1* | 3/2006 | Lee et al. | 315/312 |
| 2006/0097978 A1* | 5/2006 | Ng et al. | 345/102 |
| 2006/0274022 A1* | 12/2006 | Ohashi et al. | 345/102 |
| 2007/0115228 A1* | 5/2007 | Roberts et al. | 345/82 |
| 2007/0132750 A1* | 6/2007 | Cheng et al. | 345/207 |
| 2007/0222743 A1* | 9/2007 | Hirakata | 345/102 |
| 2008/0054825 A1* | 3/2008 | Gulsen et al. | 315/307 |
| 2008/0252664 A1* | 10/2008 | Huang et al. | 345/690 |
| 2009/0128451 A1* | 5/2009 | Tokui | 345/55 |

FOREIGN PATENT DOCUMENTS

WO    WO 2004/088401    * 10/2004

* cited by examiner

METHODS AND APPARATUS FOR BACKLIGHT CALIBRATION

FIELD OF THE INVENTION

The present invention relates generally to a display apparatus and, in particular, to systems for calibrating an array of Light Emitting Diodes (LEDs).

BACKGROUND

Backlight for Liquid Crystal Display (LCD) refers to light sources used for illuminating an LCD from the back. Light Emitting Diodes (LEDs) are usually used as such light sources, because LEDs provide wide color gamut, a tunable white point, a high dimming ratio, a long lifetime and environmental compatibility. Nevertheless, the features such as color and brightness of high-intensity LED vary according to thermal and aging conditions, leading to significant degradation of performance. As a result, optical feedback control has been used in LED backlighting systems to minimize color and brightness variation over temperature and time.

In addition, a large number of red, green, and blue LEDs are assembled as LED backlighting units for large-size LCD displays. White light or dynamic backlight is achieved by color-mixing these LEDs of primary colors: red, green, and blue, which are usually localized within a certain area of the whole screen.

For LEDs manufactured from different production bins, the intrinsic characteristics are inconsistent and the aforementioned variation in color and intensity may occur to different extents. Therefore, spatial non-uniformity in color or intensity may be visible over the backlight unit. Such spatial non-uniformity is considerable for dynamically controlled backlight, where backlight of a certain area is emitted only by a certain color of LEDs. In a two-dimensional dynamic LED backlight, an LED is driven depending on the image to be displayed. LEDs responsible for different areas of the screen are usually driven to provide different colors and brightnesses. As a result, the LEDs experience different junction-temperature variations, leading to further spatial non-uniformity.

It is difficult to ensure that all LEDs selected for a primary color of a backlight unit have the same characteristics, such as color, brightness, and driving properties.

Non-uniformity also exists intrinsically after long-term running due to the variation in rates of degradation between LEDs of different colors and LEDs of the same color. Again, all LEDs of a backlight unit cannot be easily ensured to have the same variation of characteristics over temperature and time.

Optical feedback control is being adopted in backlight units. However existing systems disadvantageously only monitor and adjust a backlight unit as a whole and do not solve the problem of spatial non-uniformity due to variation of characteristics on individual LEDs.

A need exists for a feedback control system to monitor the light output of each light source or block of light sources in a backlight unit. Further, a need exists for a system to provide adjustment against the variation of characteristics.

SUMMARY

According to an aspect of the invention, there is provided a backlight calibration apparatus, comprising: a backlight unit comprising a plurality of light sources; at least one photo-sensor adapted to measure the light emitted by the backlight unit; a photo-sensor controller coupled to the photo-sensor for controlling the photo-sensor(s); a backlight driving circuit coupled to the light sources for providing individual driving on each light source; a signal generator coupled to the photo-sensor controller and the backlight driving circuit for controlling the operation timing of photo-sensors and each of the light source such that lighting conditions from each of the light source can be acquired; and a processing unit coupled to the photo-sensor and the backlight driving circuit for analyzing the measurement data from the photo-sensors and providing an adjustment signal to the backlight driving circuit to achieve uniform lighting conditions of the backlight unit.

The light conditions may be brightness or color coordinates.

The apparatus may further comprise a memory unit coupled to the backlight driving circuit and the processing unit for storing predefined light condition settings and adjusted light condition setting.

The memory unit may further store correlation information of the geometrical factor between the photo-sensor and the light sources. The backlight unit provides backlighting for Liquid Crystal Display (LCD) panel.

The apparatus may further comprise an LCD driver for driving the LCD panel; wherein the processing unit further controls the LCD driver to control an LCD panel to display a dark image during light condition measurement.

The light sources may be Light Emitting Diodes (LEDs)

In accordance with another aspect of the invention, there is provided a method of calibrating a backlight apparatus, comprising the steps of providing saved settings for backlight driver; providing a modified timing sequence to backlight driver and photo sensor; measuring light conditions of each individual light source or each individual group of light sources in backlight unit; comparing measurement data with predefined light conditions; calculating the adjustment required on backlight driver to achieve desired light conditions; and saving calculated adjustment as new settings for backlight driver.

The method may further comprise the step of making reference of correlation information of the geometrical factor between the photo-sensor and the light sources and correcting measurement data.

The light conditions may be brightness or color coordinates.

The backlight unit may provide backlighting for Liquid Crystal Display (LCD) panel.

The method may further comprise the step of controlling a LCD panel to display a dark image during light condition measurement.

The light sources may be Light Emitting Diodes (LEDs).

The step of measuring light conditions for each individual light source may comprise the steps of: turning off all light sources and measuring background light conditions; turning on the light source to be measured and turning off other light sources; measuring light conditions; and subtracting background light conditions from measured light conditions.

The step of measuring light conditions for each individual light source may comprise the steps of turning on a plurality of light sources including the light source to be measured and measuring background light conditions; turning off the light source to be measured; measuring light conditions; and subtracting measured light conditions from background light conditions.

The step of measuring light conditions for each individual light source may be carried out in one video frame.

The step of measuring light conditions may be carried out for more than one light source in one video frame.

BRIEF DESCRIPTION OF THE DRAWINGS

Embodiments of the invention are described hereinafter with reference to the drawings, in which.

DETAILED DESCRIPTION

Figure 1:
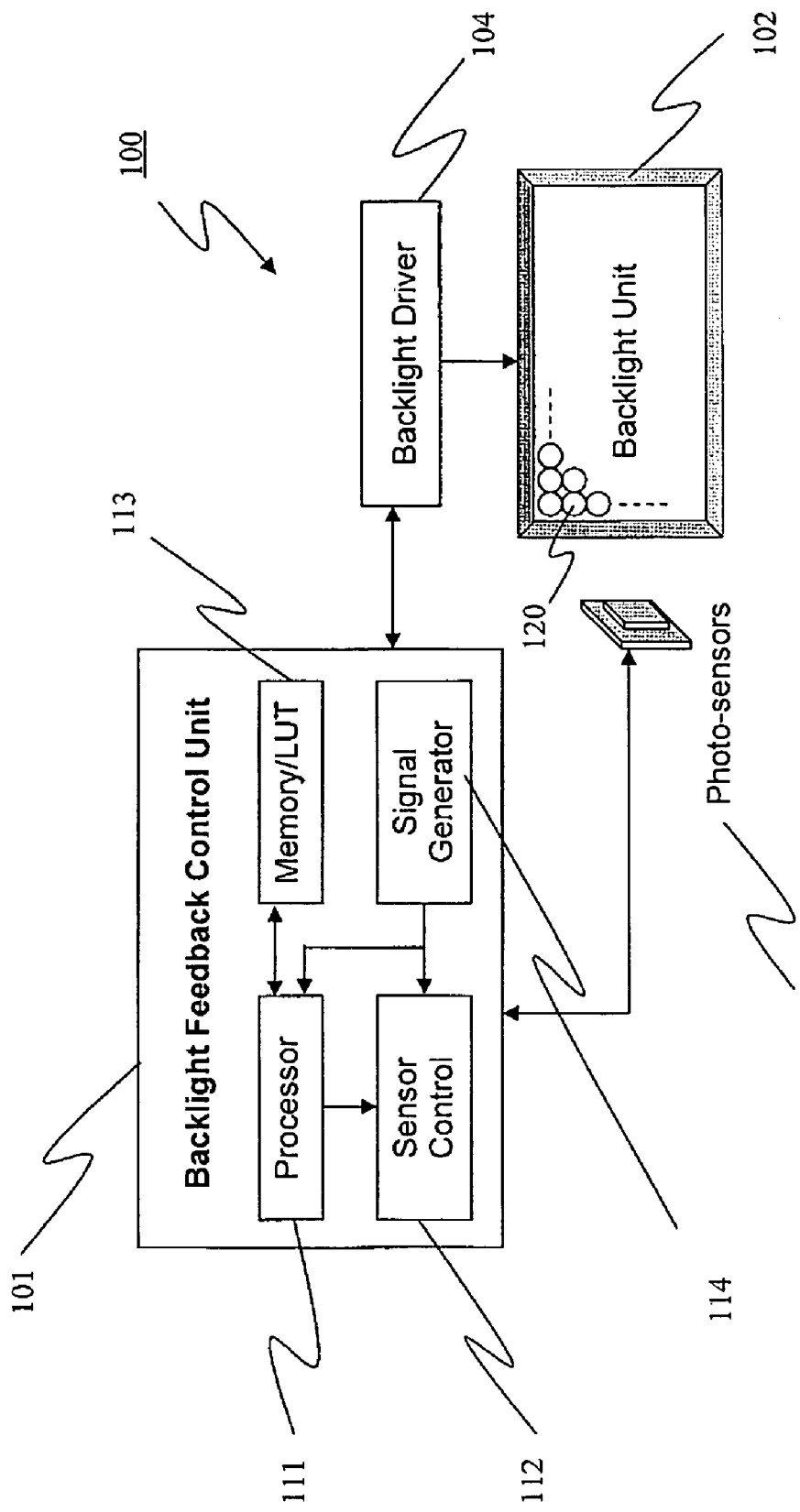
FIG. 1 is a block diagram illustrating a calibration system for LED backlight unit in accordance with an embodiment of the invention.

Methods and devices for backlight calibration are disclosed hereinafter. In the following description, numerous specific details, including timing schedules, photo-sensors, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same or like reference numerals, those steps and/or features have for the purposes of this description the same function(s) or operation(s), unless the contrary intention appears.

In the context of this specification, the word "comprising" has an open-ended, non-exclusive meaning: "including principally, but not necessarily solely", but neither "consisting essentially of" nor "consisting only of". Variances of the word "comprising", such as "comprise" and "comprises", have corresponding meanings.

FIG. 1 depicts a calibration system 100 for an LED backlight unit 102 in accordance with embodiments of the invention. The system 100 comprises a backlight feedback control unit 101, a backlight unit 102, photo-sensor's 103, and backlight driver 104. Such a backlight feedback control unit 101 comprises a processor 111, a sensor control circuit or module 112, storage devices such as memory or Look Up Table (LUT) 113, and a signal generator 114 that are able to communicate with one another, e.g. using a bus. The photo-sensors 103 are disposed at the edges of the backlight unit 102 and are coupled to sensor control 112 to receive commands. The photo sensors 103 also transmit measurement data back to the backlight feedback control unit 101. The signal generator 114 in the backlight feedback control unit 101 provides timing control for the backlight driver 104 to perform calibration, which in turn drives the LEDs in backlight unit 102. The memory/LUT 113 stores data for correlation and LED driving adjustment.

Figure 2:
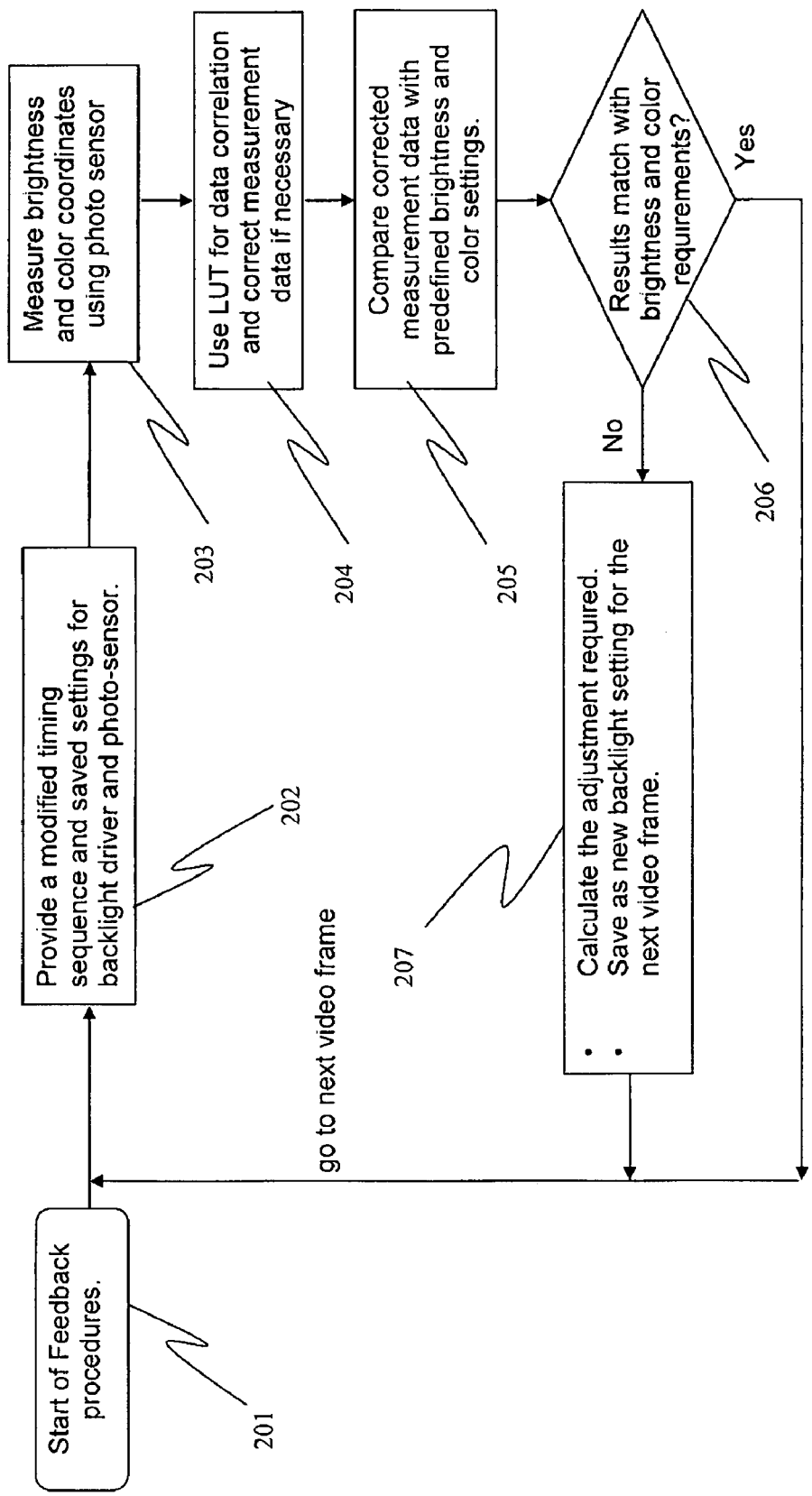
FIG. 2 is a flow diagram showing a process of calibrating in accordance with FIG. 1.

FIG. 2 illustrates operation of the calibration system 100 in FIG. 1. In step 201, the calibration system is initialized to start the feedback procedures. In step 202, a modified timing sequence and saved settings for the backlight driver and photo sensor are provided. This is done by the signal generator providing timing control for the backlight drivel to drive the backlight unit according to the desired calibration timing sequence.

In step 203, the photo-sensor measures brightness and color coordinates of the emitted light from the backlight unit throughout the calibration timing sequence. This is done by the photo sensor in response to commands from the sensor control.

In step 204, a correlation table stored in the LUT is used for data correlation. Measurement of data from the photo-sensor is corrected to overcome any sensor value distortion due to geometrical factor between the photo-sensor and LEDs in different location of the backlight unit.

In step 205, the corrected measurement data is compared with predefined brightness and color settings. The processor reads the predefined brightness and color settings from the memory and compares with the measurement data obtained in step 204, which may be stored. In decision step 206, a check is made to determine if the results match with requirements (e.g.: predefined brightness and color settings). Processing continues at step 207 if the measurement data does not match the requirements. The calculation in step 207 is preferably done by the processor. Otherwise, processing continues at step 202 for the next calibration.

In step 207, the required adjustment is calculated for the backlight driver, which drives an individual LED or an LED block, and the new brightness and color settings are saved as new backlight setting for the next video frame. The settings are stored in memory for calibration in subsequent video frames. The calculation in step 207 is preferably done by the processor.

Figure 3:
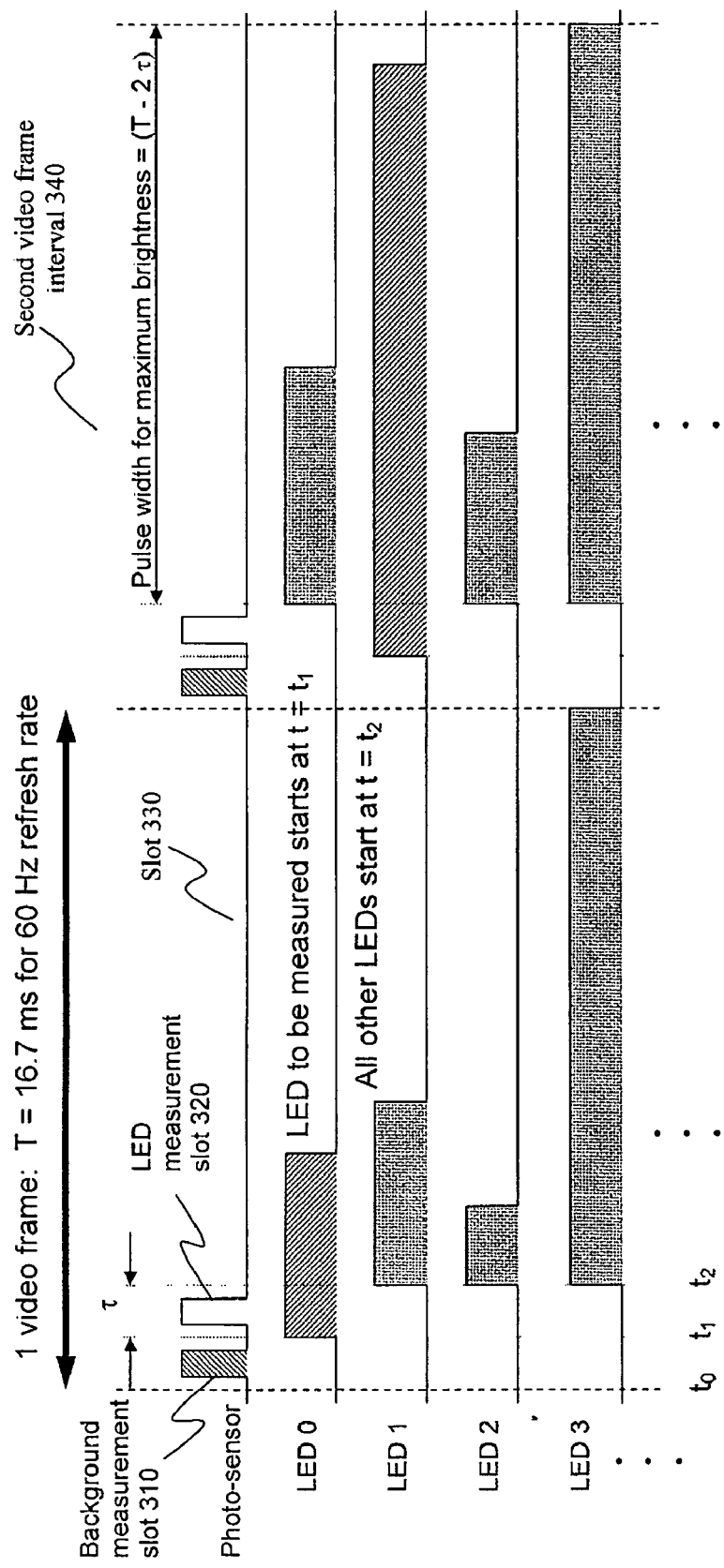
FIG. 3 is a timing diagram of signals for driving individual LEDs in a backlight unit according to an embodiment of the present invention.

FIG. 3 shows the timing of signals for driving an individual LED in the backlight unit according to a first embodiment of the present invention based on the calibration system. In the timing scheme according to this embodiment, the timeline for each video flame is divided into 3 time slots. The first time slot is the background measurement time slot 310, which lasts between times t0 and t1. In this slot, the photo-sensors are turned on and the background measurement is per formed to measure the background lighting conditions with all LEDs turned off.

The second time slot is the LED measurement time slot 320, which lasts between times, t1 and t2. In this slot 320, the measurement is carried out for a specific LED or an LED block. Photo-sensors are turned on during this time slot. All LEDs except the specific LED or LED block to be measured are turned off. The actual lighting conditions are obtained by subtracting the background conditions from the measured conditions. In the example shown in FIG. 3, the LED0 is turned on, while LED1 to LED3 and so on remain turned off during this time slot.

The third time slot is the operation time slot 330, which starts from t2 until the end of the video frame. In this time slot 330, the photo-sensor's are turned off, the LCD backlight unit performs normal operations, and an image is displayed according to the input video signal.

As such, measurement is carried out for each LED or LED block in each video frame until all LEDs in the backlight unit are measured and the measurement cycle is completed. The next measurement cycle may start immediately following the current cycle or after a regular time interval. In the second video frame interval 340, this processing is performed for LED1.

The LEDs are driven in a pulse width modulation (PWM) manner, so that a brighter light is emitted by driving an LED with a longer pulse width in that video frame. To avoid distortion of the image due to the measurement, the total pulse width for driving the LED or LED block being measured is substantially the same as the desired pulse width determined from the input video signal. In other words, the LED or LED block turns on for a shorter time in the operation time slot by $\tau$, the length of the LED measurement time slot, as compared to its normal operation. The pulse width for maximum brightness is $T-\tau_0$, where T is the period of the video frame (e.g.: $T=16.7$ ms for 60 Hz refresh rate).

If the LED or LED block to be measured is turned on for less than $\tau$ in that video frame according to the input video signal, the measurement cycle skips this LED or LED block, and no measurement is performed in the video frame.

Figure 4:
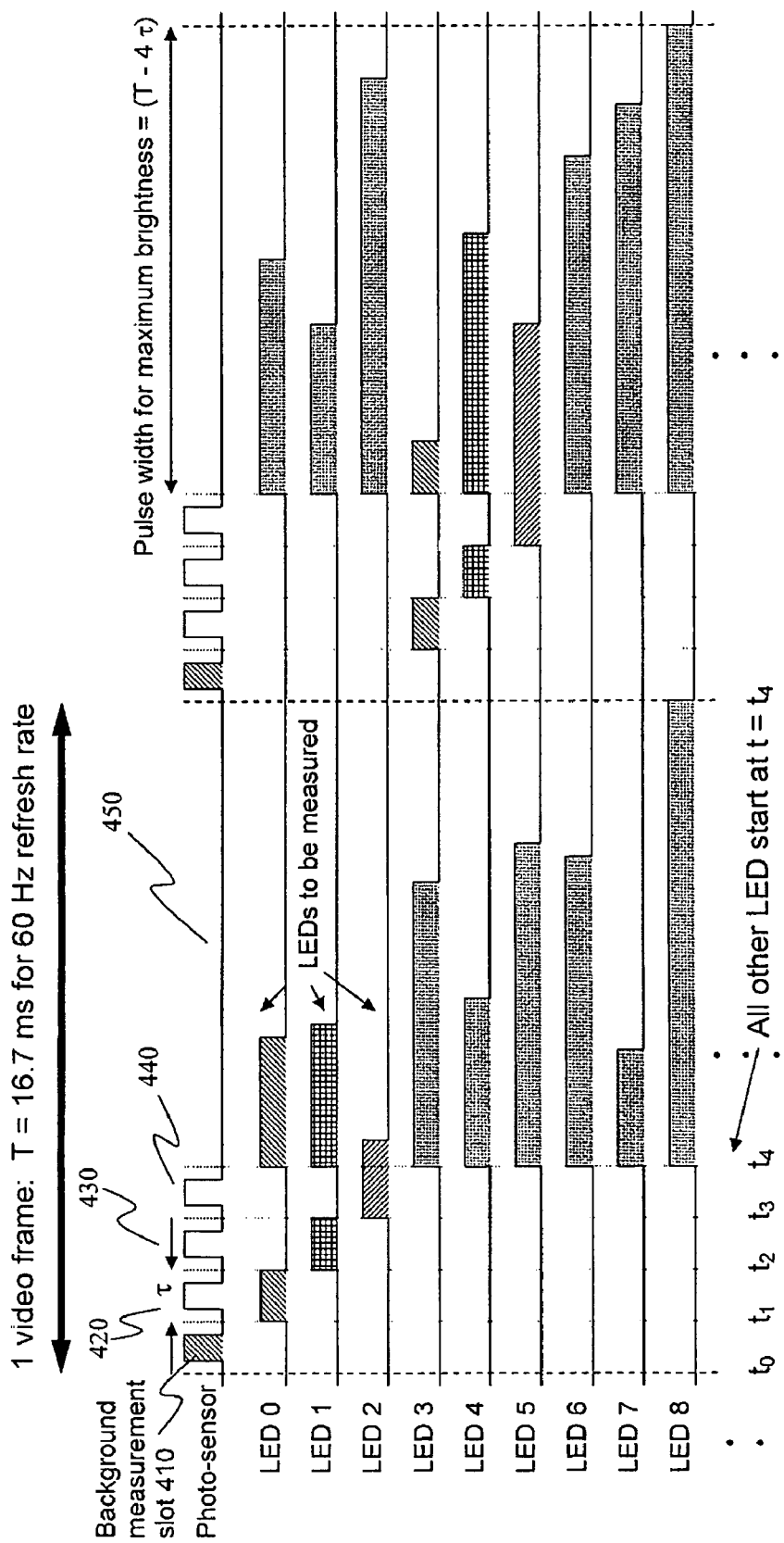
FIG. 4 is another timing diagram of signals for driving individual LEDs in the backlight unit according to still another embodiment of the present invention.

FIG. 4 illustrates timing signals for driving an individual LED in the backlight unit according to another embodiment of the present invention based on the calibration system. In the timing scheme according to this embodiment, the timeline for each video flame is divided into 5 time slots, and 3 LEDs can be measured in each single video frame. The first time slot 410 is the background measurement time slot, which lasts between times t0 and t1. The photo-sensors are turned on and a background measurement is performed where the background lighting conditions are measured with all LEDs turned off. The actual LED lighting conditions are obtained by subtracting such background conditions from the measured LED conditions.

The second time slot 420 is the first LED measurement time slot, which lasts between times t1 and t2. A measurement is carried out for the first LED or LED block, LED0. In this second time slot 420, photo-sensors 103 are turned on and all LEDs except LED0 to be measured are turned off.

The third time slot 430 is the second LED measurement time slot, which lasts between times t2 and t3. A measurement is carried out for the second LED or LED block, LED1. In this second time slot 430, photo-sensors are turned on and all LEDs except LED1 to be measured are turned off.

The fourth time slot 440 is the third LED measurement time slot, which lasts between times t3 and t4. A measurement is carried out for the third LED or LED block, LED2. In this third time slot 440, photo-sensors are turned on and all LEDs except LED2 to be measured ate turned off.

The final time slot 450 is the operation time slot, which starts from t4 until the end of the video frame. The photo-sensors are turned off, and the LCD backlight unit operates normally, and an image is displayed according to the input video signal.

Measurements are carried out for every 3 LEDs or LED blocks in each video frame until all LEDs in the backlight unit are measured and the measurement cycle is completed. The next measurement cycle may start immediately following the current cycle or after a regular time interval.

To avoid image distortion due to the measurements, the total pulse width for driving the LED or LED block being measured is substantially the same as the desired pulse width determined from the input video signal. The LEDs or LED blocks turn on for a shorter time in the operation time slot by $4\tau$, which is the length of the LED measurement time slot, as compared to their normal operation.

If the LED or LED block to be measured is turned on fort less than $\tau$ in that video flame according to input video signal, the measurement cycle skips this LED or LED block, and no measurement is performed in the video frame.

Figure 5:
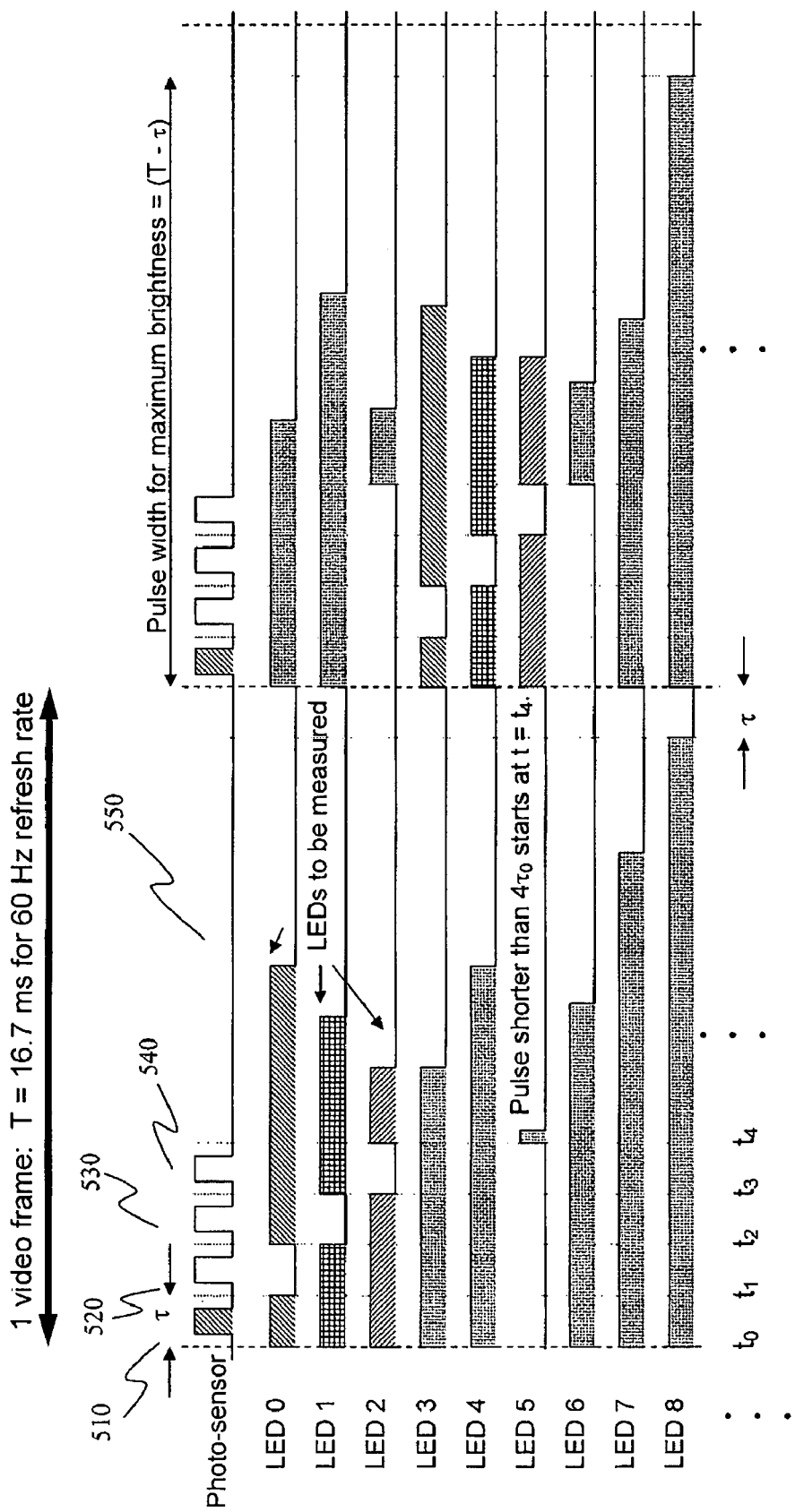
FIG. 5 is yet another timing diagram of signals for driving individual LEDs in the backlight unit according to a further embodiment of the present invention.

FIG. 5 shows the timing of signals for driving an individual LED in the backlight unit according to a fourth embodiment of the present invention based on the calibration system This embodiment involves by determining the actual LED conditions by subtraction from the measurement obtained from fully-turn-on backlight conditions. In the timing scheme according to this embodiment, the timeline for each video frame is divided into 5 time slots, and 3 LEDs are measured in each single video frame.

The first time slot 510 is the "background" measurement time slot, which lasts between times t0 and t1. Photo-sensors are turned on, and the lighting conditions with all LEDs, except those tuned on for less than $\tau$ in that video frame, are measured.

The second time slot 520 is the first LED measurement time slot, which lasts between times t1 and t2. A measurement is carried out for the first LED or LED block, LED0. Photo-sensors are turned on. All LEDs to be measured, except LED0 and those turned on for less than $4\tau$ in that video frame, are turned on in this time slot 520. The actual LED lighting condition is obtained by subtracting the measured LED conditions from the "background" conditions.

The third time slot 530 is the second LED measurement time slot, which lasts between times t2 and t3. A measurement is carried out for the second LED or LED block, LED1. Photo-sensors are turned on. All LEDs to be measured, except LED1 and those turned on for less than $4\tau$ in that video frame, are turned on in this time slot 530.

The fourth time slot 540 is the third LED measurement time slot, which lasts between times t3 and t4. A measurement is carried out for the third LED or LED block, LED2. Photo-sensors are turned on. All LEDs to be measured, except LED2 and those turn on for less than $4\tau$ in that video frame, are turned on.

The final time slot 550 is the operation time slot, which starts from time t4 until the end of the video frame. The photo-sensor's 103 are turned off. The LCD backlight unit operates normally, and image is displayed according to the input video signal.

Measurements are carried out for every 3 LEDs or LED blocks in each video frame until all LEDs in the backlight unit ate measured and the measurement cycle is completed. The next measurement cycle may start immediately following the current cycle or after a regular time interval.

To avoid distortion of the image due to the measurement, the total pulse width for driving the LED or LED block being measured is substantially the same as the desired pulse width determined from the input video signal. In other words, the LEDs or LED blocks turn on for a shorter time in the operation time slot by $\tau$ as compared to their normal operation.

For an LED or LED block that turns on for less than $4\tau$ in that video frame as determined by the input video signal, such an LED or LED block does not turn on until the operation time slot. The driving pulse of such an LED or LED block starts from time t4.

If the LED or LED block to be measured is turned on for less than $3\tau$ in that video frame according to input video signal, the measurement cycle skips this LED or LED block, and no measurement is performed in the video frame. Thus, more LEDs or LED blocks can be measured in a shorter period of time, because the measurement cycle is shorter. In a normal situation, considering corresponding LED signals for a general video image, pulses of the LED should not be too short, if the backlight signal is not of extremely low brightness or saturated color.

Figure 6:
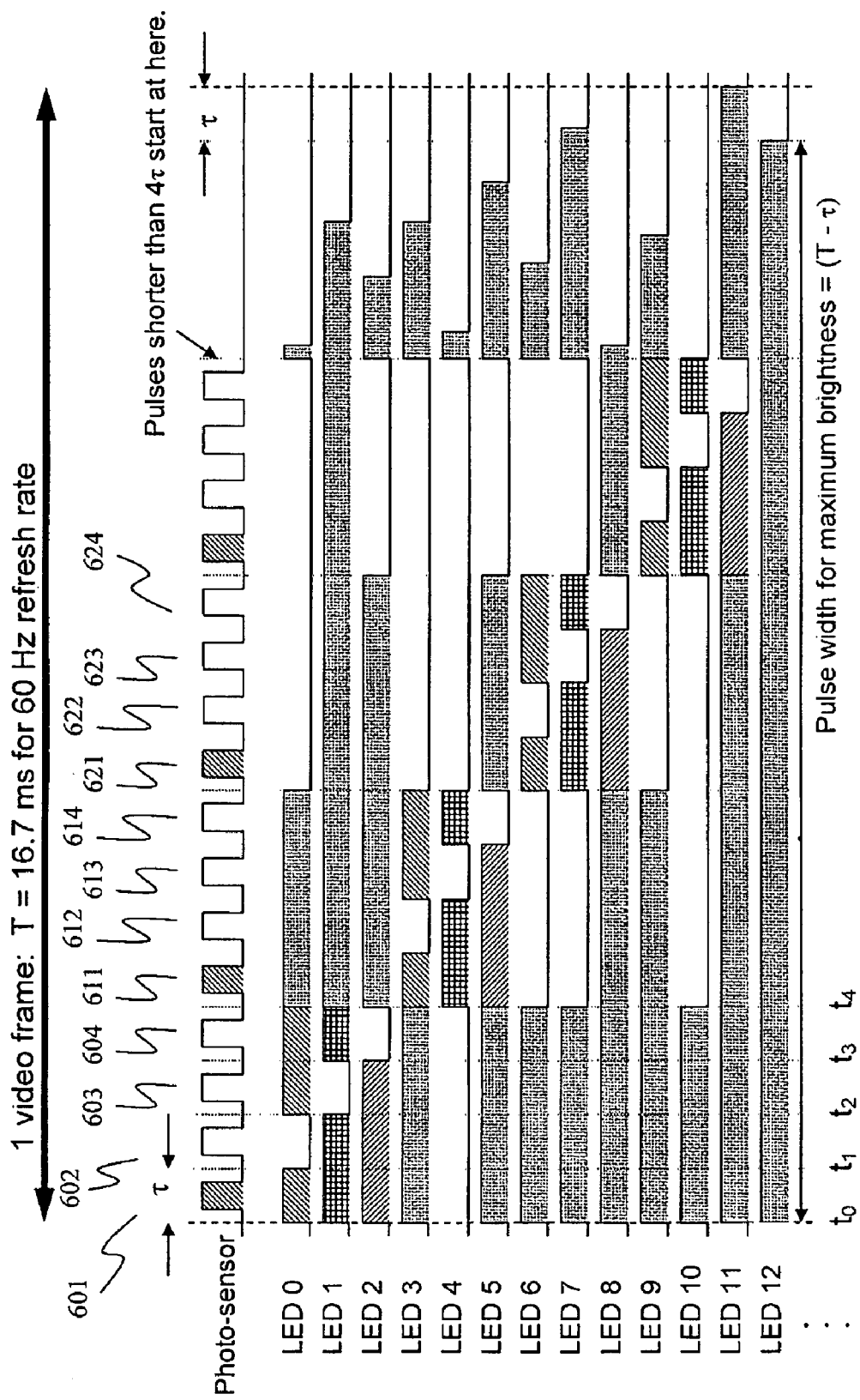
FIG. 6 is yet another timing diagram of signals for driving individual LEDs in the backlight unit according to a further embodiment of the present invention.

FIG. 6 shows timing signals for driving an individual LED in the backlight unit according to another embodiment of the present invention based on the calibration system. The embodiment is a variation of that shown in FIG. 5. According to this timing scheme, even more all-on measurement time slots 601, 611, 621, and LED measurement time slots 602-604, 612-614, 622-624, are scheduled in one video flame. Therefore, the measurement cycle for the whole backlight unit can be further reduced.

More complex computation is required for this timing scheme to determine the on-off time of LEDs or LED blocks. For example, in FIG. 6, an LED or LED block that turns on for less than 16τ in that video frame as determined by the input video signal does not turn on in every measurement time slot.

Figure 7:
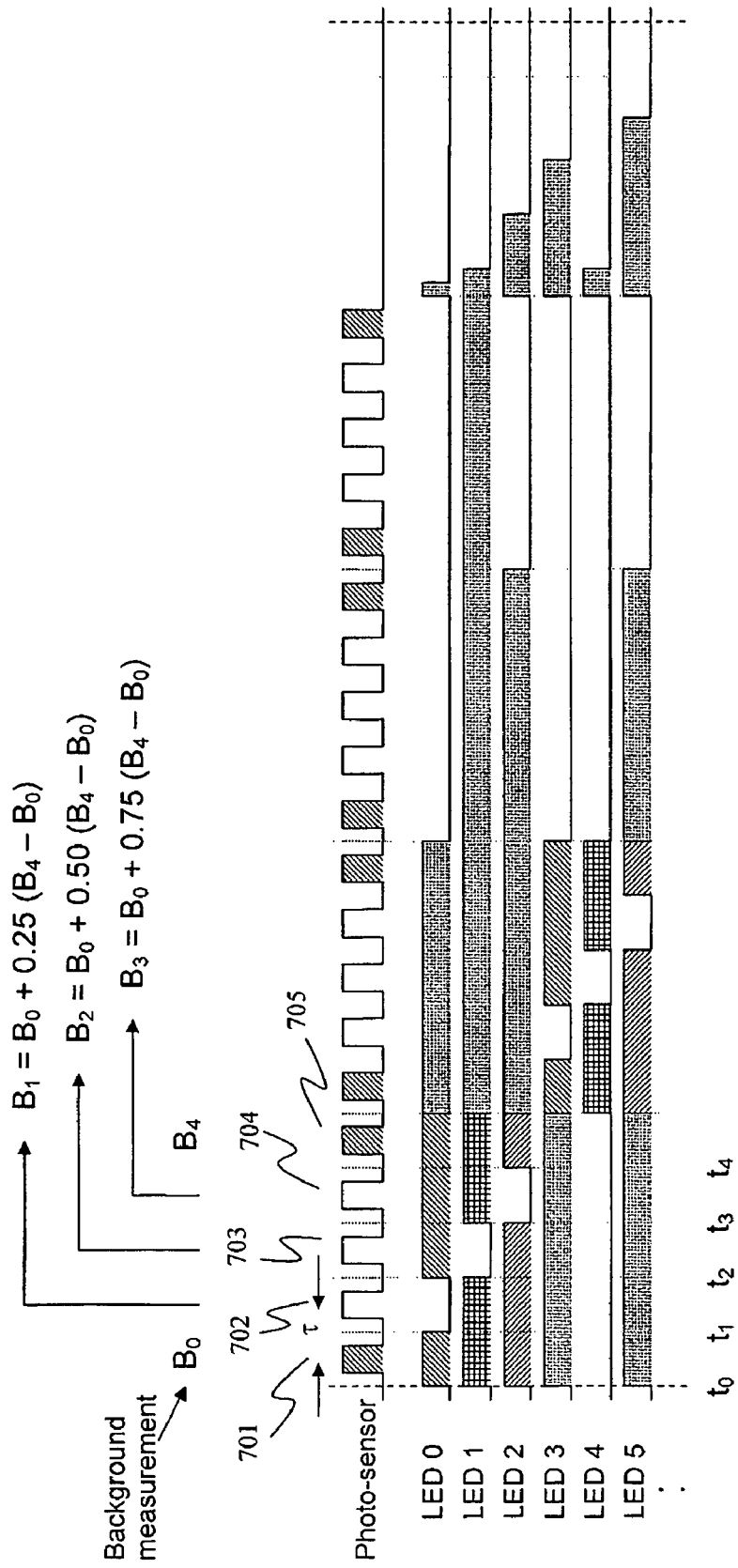
FIG. 7 is yet another timing diagram of signals for driving individual LEDs in the backlight unit according to a further embodiment of the present invention.

FIG. 7 shows the timing of signals for driving an individual LED in the backlight unit according to still another embodiment of the present invention based on the calibration system. This timing scheme is a variation of that in FIG. 6 and involves scheduling more background measurement time slots to minimize error due to background change, for example, due to ambient light change or LCD transmission.

In FIG. 7, by inserting an extra background measurement B4 at time slot 705, the backgrounds between t1 and t4 in time slots 701-704 can be estimated by interpolation between B0 and B4 assuming the change of background is linear within this short period of time. Accordingly, the estimated background measurements are:

$$B1 = B0 + 0.25(B4 - B0)$$

$$B2 = B0 + 0.50(B4 - B0)$$

$$B3 = B0 + 0.75(B4 - B0)$$

The calibration system in accordance with one or mote embodiments of the invention enables each individual LED's light output to be distinguished while not affecting the image displayed. The scheduling schemes of the foregoing embodiments allow measurements to be carried out instantaneously, and therefore deviation in color and brightness due to short-term variation in junction-temperature of each individual LED can be detected.

A further embodiment of the invention provides calibration against long-term variation. The LED measurement is performed when the LCD panel is turned on or off during time which a dark image is displayed and the LCD panel blocks ambient light from entering the internal parts of LCD display device such as the photo-sensors. Measurement on the background lighting conditions is not required. Actual LED conditions can be measured directly without any subtraction by or from the background measurement.

Figure 8:
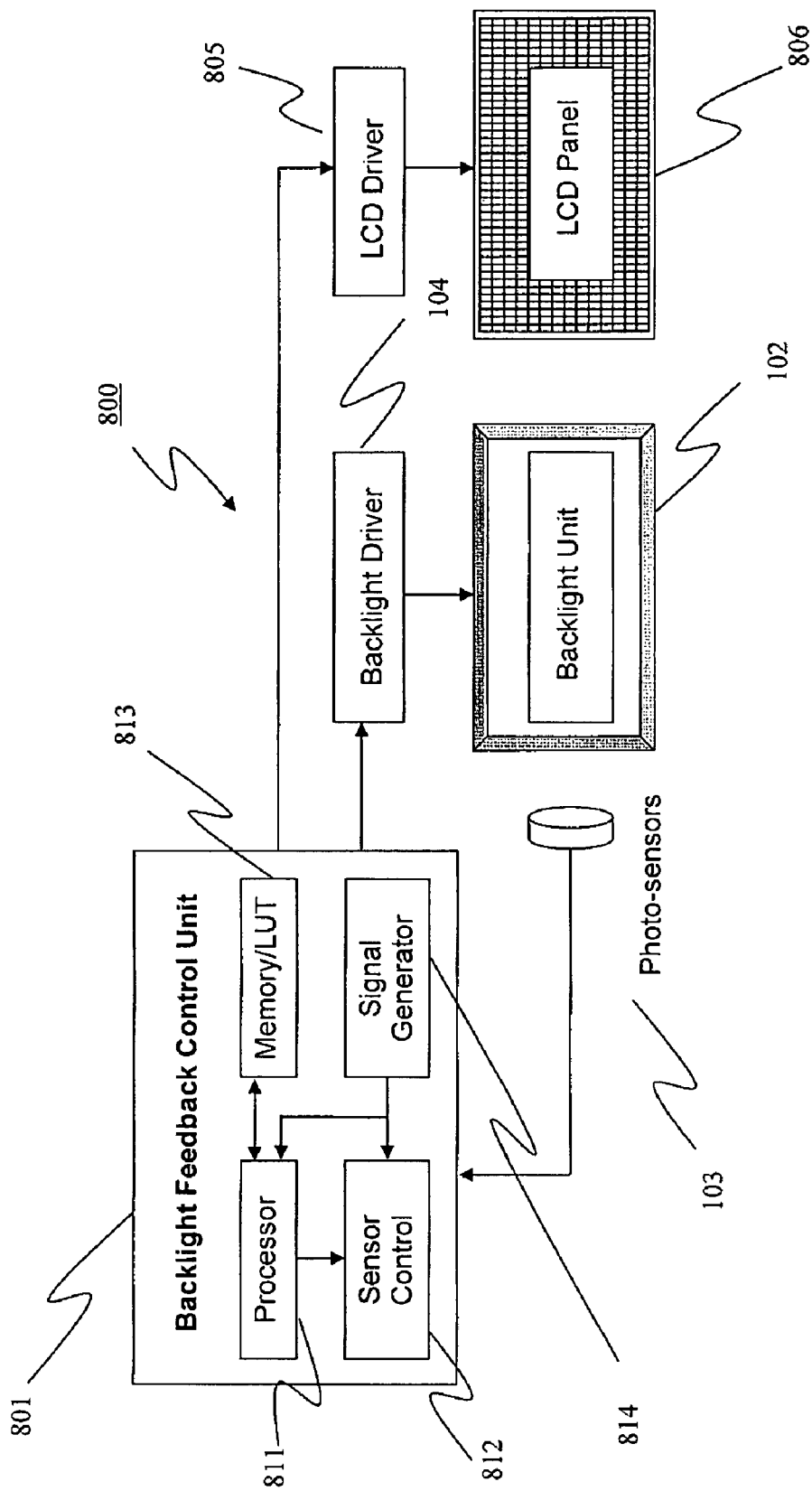
FIG. 8 is a block diagram of another calibration system in accordance with yet another embodiment of the invention.

FIG. 8 illustrates another calibration system 800 for an LED backlight unit 102. Such a calibration system 800 is modified from the system 100 of FIG. 1 in that a backlight feedback control unit 801 provides additional control of the LCD driver 805 for driving the LCD panel 806. The calibration system 800 further comprises photo-sensors 103 for measuring the light emitted by the backlight unit 102, a backlight driver 104 for driving backlight unit 102. In addition, the backlight feedback control 801 further comprises a processor unit 811 for analyzing the measurement data from the photo-sensors 103 and providing an adjustment signal to the backlight driver 104 to achieve uniform lighting conditions of the backlight unit 102; a memory unit 813 such as a LUT for storing predefined light condition settings, adjusted light condition setting, and correlation information of the geometrical factor between the photo-sensor 103 and the light sources; a sensor controller 812 for controlling the photo-sensors 103, and a signal generator 814 coupled to the sensor controlled 812, the LCD driver 805, and the backlight driver 104 for controlling the operation timing of the photo-sensors 103, the LCD panel 806 and each of the light source in the backlight unit 102 such that lighting conditions from each of the light source can be acquired.

Figure 9:
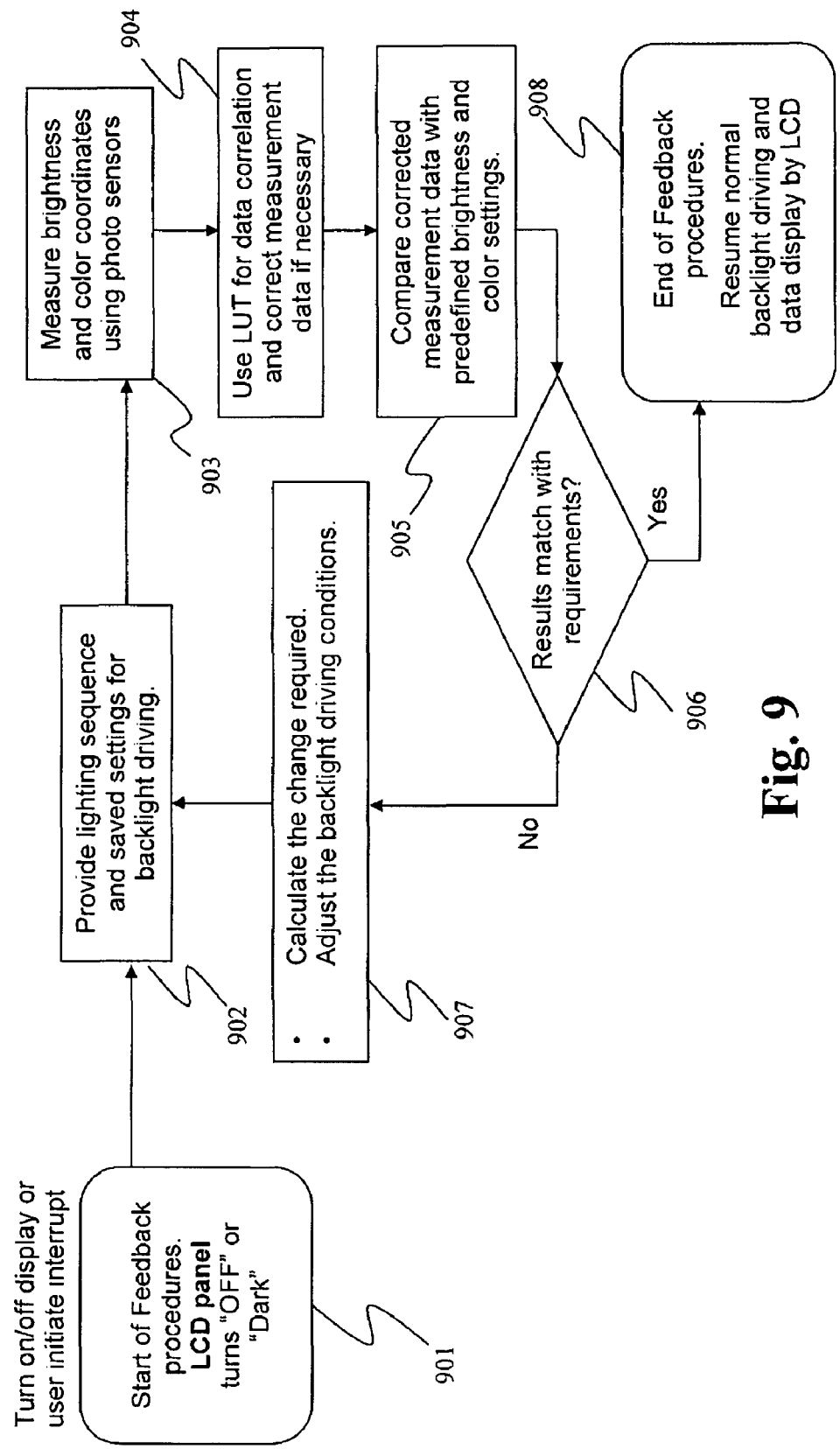
FIG. 9 is a flow diagram illustrating the calibration process implemented by the system in FIG. 8.

FIG. 9 illustrates a process of operating the calibration system 800 in FIG. 8. The flow diagram is similar to FIG. 2 except in steps 901 and 908. In step 901, when calibration is initiated, the start of feedback procedures is accompanied by the turning "off" or "dark" of the LCD panel. This is done by sending a control signal to the LCD driver by backlight feedback control unit 801. A dark image is displayed on the LCD screen which blocks the ambient light from entering the LCD display device through the screen.

In step 908 when the feedback procedures end, the backlight feedback control unit sends control signal to LCD driver to resume normal data display by LCD panel.

Figure 10:
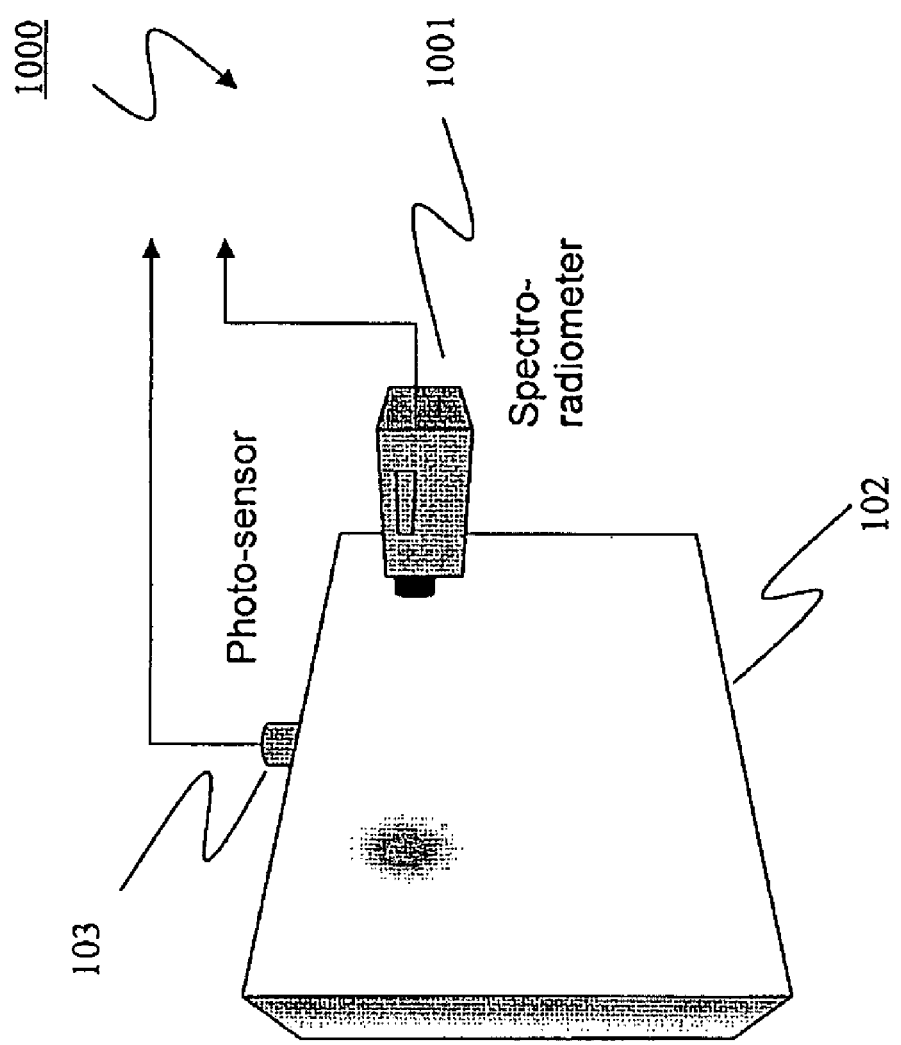
FIG. 10 is a block diagram illustrating an arrangement to correlate the geometrical factor between a photo-sensor and LEDs.

FIG. 10 illustrates an arrangement 1000 to correlate the geometrical factor between the photo-sensor 103 and backlight unit 102. The data of the correlation table stored in the LUT is created by measurement done at manufacturer. Every LED or LED block is measured by the photo-sensor 103 and a spectroradiometer 1001 in respect of color and brightness. The two measurement results are correlated and the correlation information is stored in the memory or LUT 113 of the feedback control unit 101.

Figure 11:
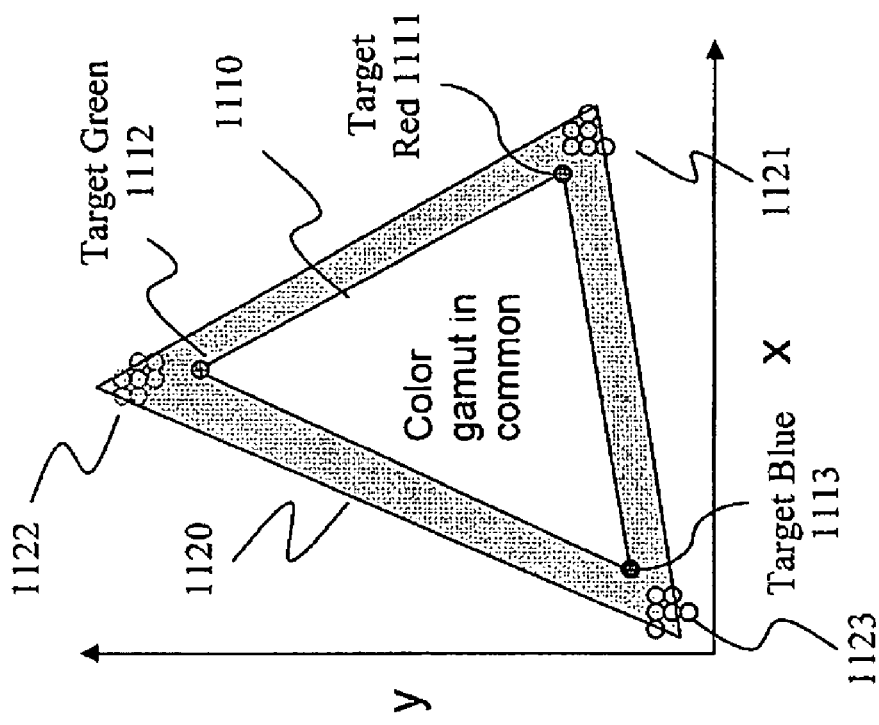
FIG. 11 is a plot illustrating the adjustment for uniformity and stability of LEDs color and brightness in accordance with one or more embodiments of the invention.

FIG. 11 illustrates the adjustment for uniformity and stability of LED color and brightness. The target red 1111, target green 1112 and target blue 1113 color points and brightness can be predefined based on an LED's specifications such that those parameters form a common color gamut 1110. For a group of R, G, and B LEDs illuminating an area of the backlight screen, their color-coordinates are measured as described in embodiments of the invention. Since these measured red 1121, green 1122 and blue 1123 color points forms a color gamut 1120 larger than the common color gamut 1110, the target red 1111, target green 1112 and target blue 1113 color points can be obtained by modifying the color mixing ratios between them. By the same process, their target brightness can also be obtained. This can be implemented in a table of transformation input to the memory of the feedback system or backlight driver.

The arrangements described are applicable to the electronic and display industries and particularly for LCD and LED devices.

The foregoing describes only some embodiments of the present invention, and modifications and/or changes can be made thereto without departing from the scope and spirit of the invention, the embodiments being illustrative and not restrictive.

We claim:

1. A method of controlling a backlight apparatus for a display device, the backlight apparatus comprising a plurality of LEDs, the control method comprising:
controlling one or more photo-sensors for measuring at least one of brightness or color of one or more LEDs;
receiving a source of video signals, each video signal including a plurality of video frames, each video frame having a video frame time period T;
subdividing the video frame time period T of each video frame into at least three sub-periods, the first sub-period being background measurement period during which one or more photo-sensors measure the background light, the second sub-period being an LED calibration period during which one or more photo-sensors measure one or more LED groups, and the third sub-period being an operation period during which the photo-sensors are switched off and LEDs are switched on for displaying the video frame, wherein each LED group comprises at least one LED and at least one LED group measured during the second sub-period of one video frame T is different from an LED group measured during a second sub-period of a subsequent video frame T;

the second sub-period is further subdivided into time slots $t_1$ to $t_n$ where n is the number of LED groups to be calibrated during the second sub-period an LED to be calibrated is switched either on or off for a time period of duration t and the photo-sensor to measure a target LED group is switched on for a time period $\tau$ during a corresponding time slot t, the time period $\tau$ being less than the time period t;

transmitting the LED measurement to a processing unit; and adjusting the driving conditions of the measured LED to control at least one of a desired brightness or a desired color based on the photo-sensor measurement.

2. The control method according to claim 1, further comprising:
switching off all LEDs during the background measurement period to measure the background light.

3. The control method according to claim 2, further comprising:
switching on one LED during each of the time period of duration t for the LED measurement whilst other LEDs remain off.

4. The control method according to claim 3, further comprising:
subtracting the background light measurement from the LED measurement.

5. The control method according to claim 1, further comprising:
switching on all LEDs except one or more LEDs which are on for a time period of duration equal to or less than the time period $\tau$ during the background measurement period to measure the background light.

6. The control method according to claim 5, further comprising:
switching off one LED during each of the time period of duration t for the LED measurement whilst other LEDs remain on.

7. The control method according to claim 6, further comprising:
subtracting the background light measurement from the LED measurement.

8. The control method according to claim 1, wherein:
said video frame time period further comprises one or more background measurement periods during which one or more photo-sensors measure the background light.

9. The control method according to claim 1, further comprising:
controlling a LCD panel to be shut when a dark image is displayed on the display device such that the ambient light is blocked from reaching the photo-sensors inside the display device; and when the LCD panel is shut, one or more photo-sensors measure the one or more LEDs.

10. An apparatus of controlling a backlight apparatus for a display device, the backlight apparatus comprising a plurality of LEDs, the control apparatus comprising:

a photo-sensor controller for controlling one or more photo-sensors for measuring at least one of brightness or color of one or more LEDs;

a signal generator and video display for receiving and displaying a source of video signals, each video signal including a plurality of video frames, each video frame having a video frame time period T, and subdividing the video frame time period T into at least three sub-periods, the first sub-period being a background measurement period during which one or more photo-sensors measure the background light, the second sub-period being an LED calibration period during which one or more photo-sensors measure one or more LED groups, and the third sub-period being an operation period during which the photo-sensors are switched off and LEDs are switched on for displaying the video frame on the display, wherein each LED group comprises at least one LED and at least one LED group measured during the second sub-period of one video frame T is different from an LED group measured during a second sub-period of a subsequent video frame T;

the second sub-period is further subdivided into time slots $t_1$ to $t_n$ where n is the number of LED groups to be calibrated during the second sub-period and an LED group to be calibrated is switched either on or off for a time period of duration t and the photo-sensor to measure a target LED group is switched on for a time period $\tau$ during a corresponding time slot t, the time period $\tau$ being less than the time period t; and a processing unit for receiving LED measurements from one or more photo-sensors and adjusting the driving conditions of the measured LED to control at least one of a desired brightness or a desired color based on the photo-sensor measurement.

11. The control apparatus according to claim 10, wherein:
all LEDs are switch off during the background measurement period to measure the background light;
one LED is switched on during each of the time period of duration t for the LED measurement whilst other LEDs remain off; and
the background light measurement is subtracted from the LED measurement.

12. The control apparatus according to claim 10, wherein:
all LEDs are switched on except one or more LEDs which are on for a time period of duration equal to or less than the time period $\tau$ during the background measurement period to measure the background light;
one LED is switched off during each of the time period of duration t for the LED measurement whilst other LEDs remain on; and
the background light measurement is subtracted from the LED measurement.

13. The control apparatus according to claim 10, wherein:
said video frame time period further comprises one or more background measurement periods during which one or more photo-sensors measure the background light.

14. The control apparatus according to claim 10, further comprising:
a LCD driver for controlling a LCD panel to be shut when a dark image is displayed on the display device such that the ambient light is blocked from reaching the photo-sensors inside the display device; and when the LCD panel is shut, one or more photo-sensors measure the one or more LEDs.

15. A method of controlling a backlight apparatus for a display device, the backlight apparatus comprising a plurality of LEDs, the control method comprising:
    one or more photo-sensors for measuring at least one of brightness or color of one or more LEDs;
    receiving a source of video signals, each video signal including a plurality of video frames, each video frame having a video frame time period T;
    subdividing the video frame time period into at least two sub-periods, the first sub-period being an LED calibration period during which one or more photo-sensors measure the one or more LEDs, and the second sub-period being an operation period during which the photo-sensors are switched off and LEDs are switched on for displaying the video frame on the display, wherein each LED group comprises at least one LED and at least one LED group measured during the second sub-period of one video frame T is different from an LED group measured during a second sub-period of a subsequent video frame T;
    the first sub-period is further subdivided into time slots $t_1$ to $t_n$, where n is the number of LED groups to be calibrated during the first sub-period and an LED group to be calibrated is switched either on or off for a time period of duration t and the photo-sensor to measure a target LED group is switched on for a time period $\tau$ during a corresponding time slot t, the time period $\tau$ being less than the time period t;
    transmitting the LED measurement to a processing unit; and
    adjusting the driving conditions of the measured LED to control at least one of a desired brightness or a desired color based on the photo-sensor measurement.

16. The control method according to claim 15, wherein:
    said video frame time period further comprises a background measurement period prior to the first sub-period, during which one or more photo-sensors measure the background light.

17. The control method according to claim 16, further comprising:
    switching off all LEDs during the background measurement period to measure the background light.

18. The control method according to claim 17, further comprising:
    switching on one LED during each of the time period of duration t for the LED measurement whilst other LEDs remain off.

19. The control method according to claim 15, further comprising:
    switching on all LEDs except one or more LEDs which are on for a time period of duration equal to or less than the time period $\tau$ during the background measurement period to measure the background light.

20. The control method according to claim 15, further comprising:
    switching off one LED during each of the time period of duration t for the LED measurement whilst other LEDs remain on.

21. The control method according to claim 15, further comprising:
    controlling a LCD panel to be shut when a dark image is displayed on the display device such that the ambient light is blocked from reaching the photo-sensors inside the display device; and when the LCD panel is shut, one or more photo-sensors measure the one or more LEDs.

* * * * *